J. M. SEYMOUR.
Attaching and Adjusting Wabbling Saws on Their Arbors.

No. 154,808. Patented Sept. 8, 1874.

Witnesses:
J. Mason Goszler
J. J. Williamson

Inventor:
James M. Seymour
By N. Cranford
atty.

UNITED STATES PATENT OFFICE.

JAMES M. SEYMOUR, OF NEWARK, NEW JERSEY.

IMPROVEMENT IN ATTACHING AND ADJUSTING WABBLING-SAWS ON THEIR ARBORS.

Specification forming part of Letters Patent No. 154,808, dated September 8, 1874; application filed January 3, 1874.

*To all whom it may concern:*

Be it known that I, JAMES M. SEYMOUR, of Newark, in the county of Essex, in the State of New Jersey, have made certain Improvements in Attaching and Adjusting Wabbling-Saws on their Arbors, of which the following is a specification:

The object of this invention is to securely attach and adjust a wabbling-saw to its mandrel or arbor, so that its angle of inclination to the mandrel may be varied to be more or less, and when so fixed in the angle it can be adjusted on said arbor or mandrel without changing its angularity; and it consists in the construction of the parts whereby such object is secured, as will be fully hereinafter described.

Figure 1:
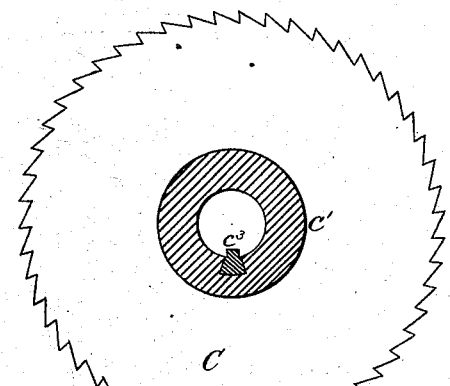
Figure 2:
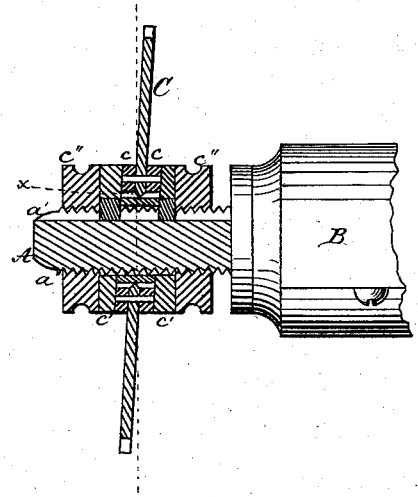
Figure 3:
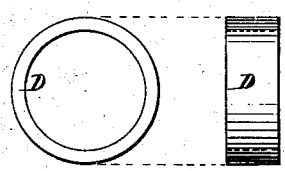
Figure 4:
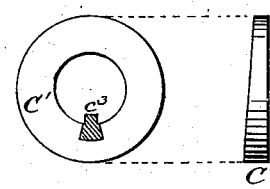

In the drawings, Figure 1 is a side view of a circular saw with a washer attached. Fig. 2 is a part sectional view of the saw and its attendant devices, whereby the saw is adjusted and secured to its arbor; Figs. 3 and 4, details; and Fig. 5 a side view of the saw in position on its arbor.

Figure 5:
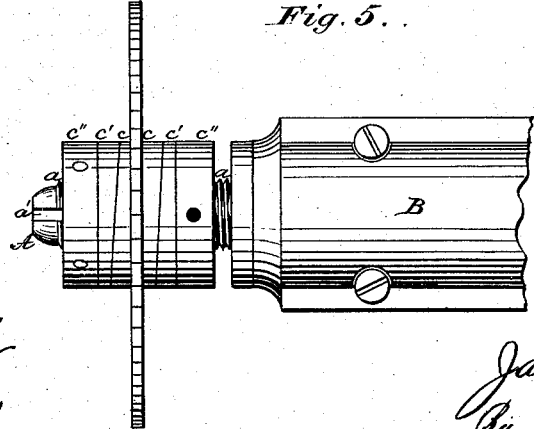

A is the arbor or mandrel, upon which the saw or cutter is placed and adjusted, and has a screw-thread, $a$, cut thereon, and a longitudinal groove, $a'$, in one side. B is the journal-box, in which the arbor or mandrel revolves, and is secured in any proper manner to such support as may be used for holding it in place. C is a saw or cutter, having its eye a little larger than the diameter of the screw-thread on the mandrel, so as to admit a loose sleeve to go between the screw-thread and the eye of the saw or cutter. D is the loose sleeve, having its inner diameter just large enough to go over the screw-threads on the mandrel or arbor A, and its outer diameter or periphery to fit in the interior diameter of the eye of the saw or cutter, which is made to have a knife-edge, $x$, that bears upon the sleeve, so that it can be turned on the sleeve to any desired angle without changing materially its bearing. The sleeve D is of the length or nearly the same length that the thickness of the saw and the inclined or wedge-shaped washers are, that are fast on each side of the saw. $c\ c$ are wedge-shaped washers riveted or made fast in any secure way to the sides of and around the eye of the saw, and so placed that the thinnest edge of one, on one side of the saw, shall be placed exactly opposite to the thickest edge on the other side of the saw, which will make the outer sides of the washers parallel. The eyes or inner diameters of these washers are greater than the diameter of the eye of the saw, to allow the cutter or saw to be changed on the sleeve in its angularity. $c'\ c'$ are loose wedge-shaped washers, having the same inclination or wedge that the fixed washers have, and an eye to slip over the threads of the screw on the arbor or mandrel. These washers have an inwardly-projecting feather, $c^3$, that fits into the groove $a$ in the saw arbor or mandrel, and prevents their turning upon the arbor, and one is placed on one side, and the other on the opposite side, of the saw, as seen in Figs. 2 and 5. $c''\ c''$ are screw-nuts to hold the saw and washers securely in place on the mandrel when properly adjusted, one of which is placed on the outer side of each washer, $c'$.

By this construction and arrangement of parts the saw can be adjusted to be at right angles with the axis of the arbor, or it can be inclined to be at an angle therewith to the extent of the greatest inclination of the washers $c$ and $c'$, by revolving the saw with the fixed washers, while the loose washers cannot revolve, the angularity of the saw will be changed, and when the saw is adjusted to its proper angle, the same with its fixed washers can be moved horizontally upon the arbor or mandrel without changing its its inclination or angle.

Having thus described my invention, what I claim, and desire to secure by Letters Patent, is—

1. The knife-edge $x$ on the saw or cutter C, in combination with the sleeve D, fixed washers $c$, loose washers $c'$, screw-nuts $c''$, and grooved arbor A, in the manner substantially as described.

2. The saw or cutter C, having the wedge-shaped fixed washers $c$ and intermediate devices, as described, in combination with the holding screw-nuts $c''$ working on the screw-threaded arbor A, to adjust the saw or cutter horizontally upon the arbor, substantially as described.

3. The sliding sleeve D, in combination with the knife-edge $x$ of a wabbling saw or cutter, C, substantially as described.

Witnesses:     JAS. M. SEYMOUR.
  MONROE H. KING,
  ALBERT F. HALL.